July 7, 1964 J. SCHMIDT 3,140,084
SHOCK STRUT

Filed Dec. 27, 1960 2 Sheets-Sheet 1

*INVENTOR.*
JACOB SCHMIDT
BY
*Agent*

July 7, 1964

J. SCHMIDT 3,140,084

SHOCK STRUT

Filed Dec. 27, 1960

INVENTOR.
JACOB SCHMIDT

United States Patent Office 3,140,084
Patented July 7, 1964

3,140,084
SHOCK STRUT
Jacob Schmidt, Van Nuys, Calif., assignor to Lockheed Aircraft Corporation, Burbank, Calif.
Filed Dec. 27, 1960, Ser. No. 78,619
3 Claims. (Cl. 267—64)

This invention relates generally to shock struts or fluid springs and more particularly to a new and improved shock strut suitable for use in aircraft landing gears.

As used on an aircraft landing gear, the shock strut is basically a piston-cylinder combination in which there is a volume of hydraulic fluid and air under high pressure. The air takes the inital shock of the touchdown on landing of the aircraft and any bumps as its taxis. Strut compression between touchdown and static condition exertsforces absorbed by a combination of air and fluid pressure. A large air pressure is required to support a modern, heavy aircraft of 100,000 or 150,000 pounds. When the wheel initially touches the runway, there is a large rearward directed load lateral to the walls of the piston and its cylinder. This frictional load is added to the internal pressure and presents a relatively large force which must be overcome before the piston will move within the cylinder to cushion the landing. The internal air pressure plus the the frictional load is termed a breakaway force. The breakaway force must be overcome the air pressure and the dynamic forces of the hydraulic fluid may cushion the landing. Until that breakaway force is overcome the loads are so great so as to approach those which would be experienced if the strut were a wholly rigid member. It is desirable and necessary to overcome these breakaway forces or reduce them so as to prevent jolt to the passengers and damage to the aircraft. Since the frictional loads normal to the piston's reciprocable movement are always present some other means must be devised to reduce the breakaway force.

It is an object, therefore, of this invention to provide a shock strut having features reducing the breakaway forces necessary to compress it. The force biasing the piston outwardly from the cylinder is reduced during the initial part of its inward stroke.

It is another important object of this invention to provide a shock strut incorporating a fluid spring wherein the spring rate during initial strut compression from the fully extended position of the piston is substantially lower than that experienced during the latter part of the stroke of the piston. Means to absorb part of the internal pressure of the piston-cylinder combination during the initial part of the stroke are provided.

It is another object of this invention to provide a strut capable of reducing breakaway forces by reduction of extension pressure during an initial part of the inward stroke of the piston which is adaptable to struts presently in use not incorporating the advantages of this invention. Internal modification with no change to the basic structure is possible when following the tenets of this invention.

Further advantages will become apparent from a reading of the following specification when taken in conjunction with the appended drawings.

The conventional airplane shock strut is a piston and cylinder combination containing usually hydraulic fluid and air under high pressure which absorbs shock between the aircraft and the ground on landing and during taxi. During taxi the forces tending to compress the aircraft strut are entirely vertical or parallel to the axis of the piston cylinder combination. The internal air pressure absorbs all of these forces and constitutes the only force resticting inward movement of the piston in the cylinder. However, upon landing a lateral force from the forward motion of the airplane is exerted upon either the piston or the cylinder whichever has the landing wheel attached to it. This lateral force causes a great frictional load between the piston and the cylinder which is additive with the internal air pressure resulting in a magnified force which must be overcome before the piston may be moved within the cylinder to cushion the load of the aircraft coming down on the ground. This combination internal load plus frictional load resulting from the lateral force during landing results in a great shock to the aircraft and its occupants and has frequently led to structual damage of the aircraft.

The internal air pressure of the strut must be maintained at a high enough level to support the aircraft when its entire weight is upon the gear. The frictional forces on landing by reason of the lateral load will always be present. Therefore, a solution other than reducing air pressure must be found. According to the present invention the solution to this problem is achieved by balancing the internal pressure of the piston cylinder combination over the part of the compression stroke during which lateral friction loads are greatest. This is from the extremity of piston extension to a short distance inwardly into the cylinder.

One means of accomplishing this uses a relief piston effectively attached to the closed end of the cylinder which absorbs the pressure over its area. The relief piston lies within the piston assembly which slides relative thereto during part of the compression stroke. There remains a sufficient amount of pressure to extend the piston to its extremity for initial cushioning.

This balancing may further be accomplished by use of a heavy spring effective for a short distance from the extension extremity to bias the piston and cylinder together in opposition to the extension pressure.

Figure 1:
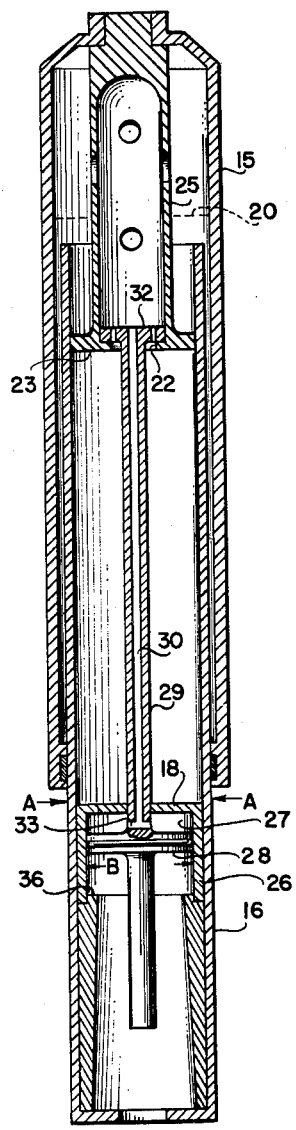
FIGURE 1 is a simplied cross sectional view of a device showing the principles of the invention.
Figure 2:
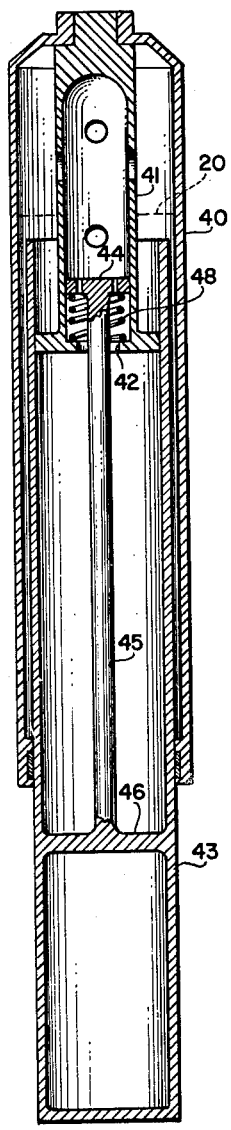
FIGURE 2 is a modification of the invention.
Figure 3:
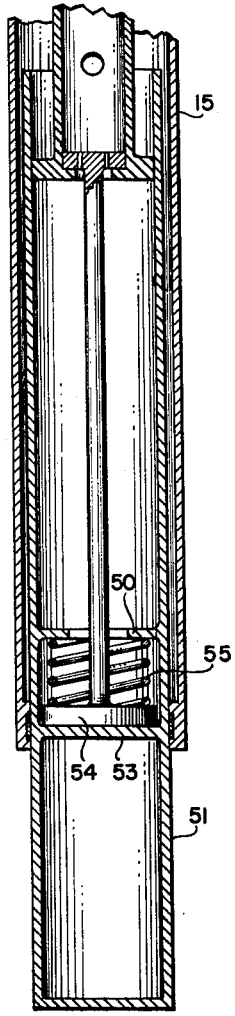
FIGURE 3 shows a second modification.
Figure 5:
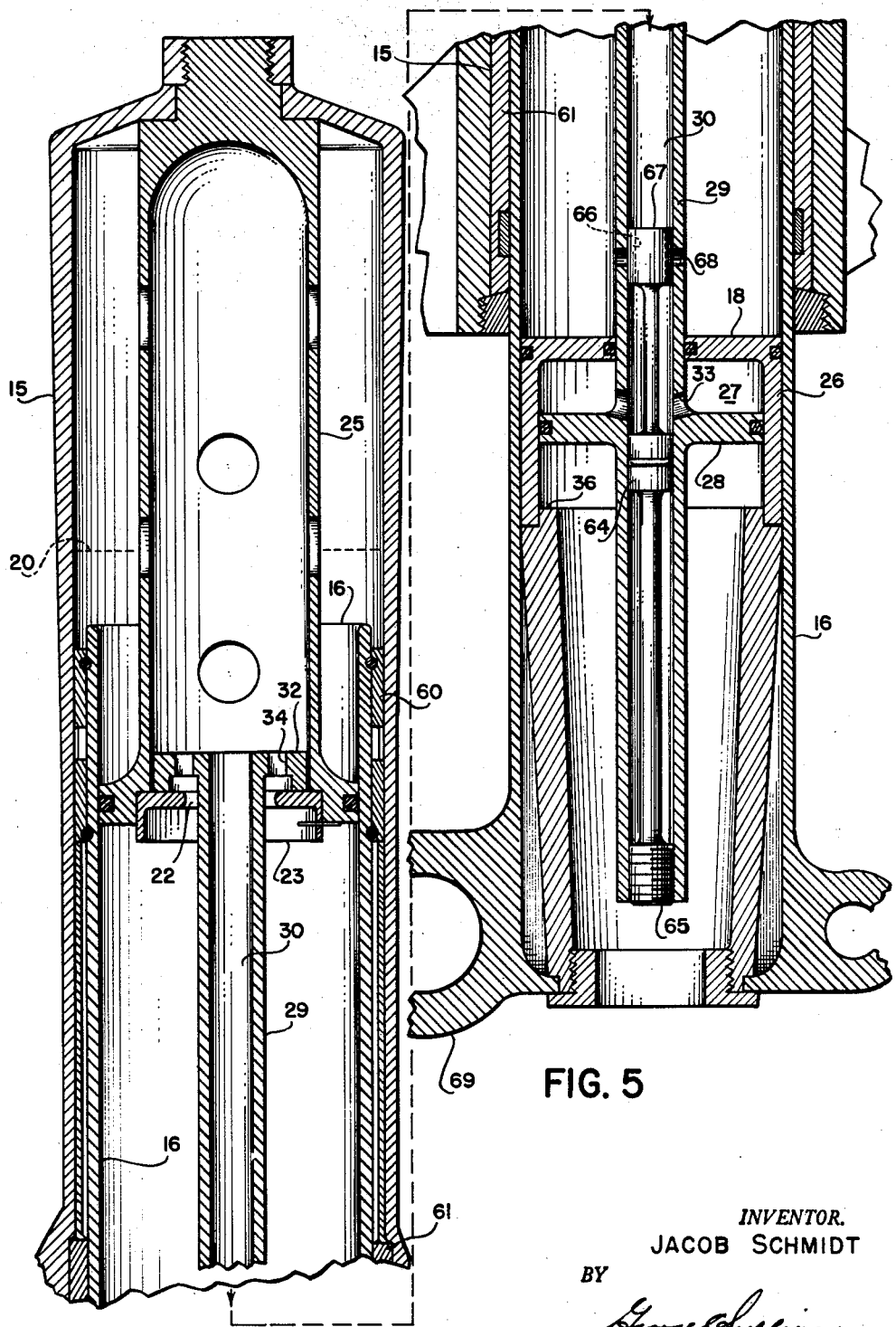
FIGURE 5 is a detailed view of the invention as shown in FIGURE 1.

FIGURE 1 shows diagrammatically and FIGURE 5 shows in greater detail a strut having a relief piston which is effectively attached to the cylinder to balance internal pressure during part of the compression stroke. FIGURE 2 and FIGURE 3 show two different methods of using heavy duty springs to counterbalance the pressure at the extension extremity.

Figure 4:
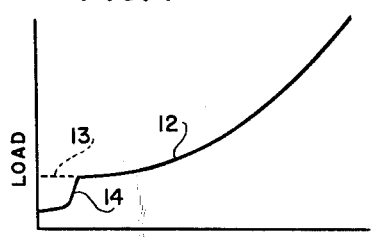
FIGURE 4 is a chart showing the effects on the pressure curve of use of the present invention.

In FIGURE 4, curve 12 with its dotted line extension 13 is a plot of the static load pressure of a piston-cylinder combination as compared to its length of stroke for a strut not embodying the present invention. Note that the first part of the stroke shown by a curve 13 starts at a relatively high load. This combined with the frictional load creates a high breakaway force. The present invention contemplates reducing the pressure at the extremity of extension 13 leaving only slightly more than is necessary to extend the piston so that the combination with the frictional load during the initial touchdown of the aircraft will be minimal. Curve 14 shows the internal load of the strut assuming that the piston carries the landing wheel during the initial part of the inward stroke. It should be noted that the usual dynamic pressures due to the effects of the hydraulic fluid are not changed from prior art structure.

A diagrammatic cross section of one form of the invention is shown in FIGURE 1, the parts described also appearing in the detailed drawing of FIGURE 5. Cylinder assembly 15 and piston assembly 16 form the basic components of the strut. The piston assembly 16 is provided with a bulkhead 18 against which the internal pressure is exerted. The chamber formed by the piston and cylinder combination is filled to approximately level 20 with hydraulic fluid. Air under pressure occupies the area above that level 20. The rate of compression of the piston assembly 16 within the cylinder 15 is governed by the size of orifice 22 in orifice plate 23. Orifice plate 23 is supported by the orifice tube 25 fixed to the upper end of the cylinder assembly 15. The smaller the orifice 22, the slower the hydraulic fluid will flow through it. The rate of compression of piston assembly 16 can be governed by making orifice 22 smaller for slower rates and larger for faster rates.

Bulkhead 18 has a skirt 26 forming another cylinder having a smaller internal diameter B than that above bulkhead 18. Relief piston 28 rides inside skirt 26 and forms a chamber 27 below bulkhead 18. It is fixed to a hollow shaft 29 having an internal opening 30 extending upwardly into the orifice tube. Relief piston guide 32 at the top of the relief piston shaft 29 rides on the inside of orifice tube 25 to guide it up and down. A plurality of passages 34 (FIGURE 5) are included in the piston guide 32 and are larger than orifice 22 to permit free fluid passage without further damping. The internal pressure from the air at the top of the cylinder 15 acts against the entire cross sectional area of piston assembly 16 to extend it. The longitudinal opening 30 in the shaft 29 is open to the chamber 27 through lateral aperture 33 via passages 66 in plug 67 normally covering drain ports 68 in the FIGURE 5 view. This permits the internal pressure of the piston-cylinder combination of the strut to act on the relief piston 28. When the pressure has extended piston 28 outwardly to the point where relief piston guide 32 rests on orifice plate 23, the pressure exerted on piston 28 will be transmitted directly to the cylinder 15 through tube 25. To this point, the piston 28 has rested against stop 36 so that the piston assembly 16 is biased outwardly by the internal pressure times the area whose diameter is A. When guide 32 is stopped by orifice plate 23, the force against the relief piston area, whose diameter is B, is eliminated as an extending force. Only the difference remains to extend piston assembly 16.

Means to drain the strut is provided in the FIGURE 5 embodiment by the threadedly removable plug 66 interconnected to a sealed plug 64 and to the above noted plug 67.

When the shock strut is compressed from its fully extended position as shown in FIGURE 1, the initial outward force against which the compression force acts is only the difference between that of diameter A and diameter B. In an aircraft, the frictional load would be added to this. When the strut is compressed to the point where stop 36 contacts the underside of relief piston 28, the force to further compress the strut will be total the internal pressure of diameter A. The point at which the relief piston 28 contacts stop 36 is shown in FIGURE 4 as the sharp upswing in curve 14 toward curve 12. To arrive at the true loadings in the strut, the dynamic pressure must be added to the loads shown by curves 12 and 14. Bulkhead 18 is provided to initiate movement of hydraulic fluid until piston 28 is contacted by stop 36. It can be perforated or eliminated with small changes in result.

FIGURE 2 shows a modification of the concept shown in FIGURE 1. The cylinder assembly 40 is likewise equipped with an orifice tube 41 having an orifice 42 at its lower end, a piston assembly 43 and a shaft 45 extending from a bulkhead 46 across the intermediate part of piston assembly 43. In this instance a spring 48 provides the counteracting force at the extremity of the extension of piston assembly 43. The spring is chosen so that its force will be slightly less than the internal pressure above the fluid level 20. The spring will be compressed when the piston assembly 43 is fully extended, exerting a resistive force to the internal pressure. When the piston assembly 43 is moved inwardly to a point where spring 48 is completely extended, it no longer counteracts the internal air pressure. Thus, the internal pressure will be counteracted so that the normal breakaway forces on landing of the aircraft on which such a strut might be mounted will be reduced. Note that in FIGURE 2 the spring is mounted under the piston guide 44 in the orifice tube 41.

FIGURE 3 shows another form of the invention similar to FIGURE 2 wherein a spring 55 between the internal flange 50 and piston 54 provides the counteracting force at the initial part of the stroke. The bulkhead 53 provides a stop against which the piston 54 rests when the piston assembly 51 moves in a short distance so as to eliminate the effects of spring 55 which counterbalances the extension or internal pressure of the piston-cylinder combination toward the extremity of its extension.

A concept for relieving strut pressure along with three means of accomplishing it have been presented. It will be noted that many modifications may be made within the scope of the following claims without departing from the bounds and limits defined by those claims. Having set out the details of three forms of my invention each of which in itself amounts to invention, I claim the following combinations and their equivalents as my invention:

1. A shock strut including a cylinder assembly, a piston assembly reciprocable inside the cylinder assembly and defining a fluid tight first chamber therewith, orifice means affixed to said cylinder assembly and extending into said piston assembly, an elastic pressure media in said first chamber biasing the cylinder and piston apart, a relief piston having a maxamium diameter portion thereof slidable inside the piston assembly, a bulkhead separating said relief piston from said first chamber and defining a second chamber with said relief piston and said piston assembly, relief passage means interconnecting said second chamber and said cylinder opposite said first chamber, means to stop outward movement of the relief piston prior to complete extension of the piston assembly within the cylinder assembly, stop means on the piston assembly to contact the relief piston after part compression of the strut, said relief piston being removed from operation as a piston assembly extending element upon being contacted by said piston assembly.

2. A shock strut including a cylinder, a hollow piston member reciprocable inside the cylinder having a closed end, an orifice tube fixed to and extending from the closed end internally of the cylinder, an orifice plate fixed to the lower end of the orifice tube, a relief piston guide above the orifice plate, an orifice in the orifice plate, a relief piston shaft integral with and depending from the relief piston guide through the orifice, a transverse bulkhead in the piston assembly intermediate its ends, an aperture in the bulkhead, the relief piston shaft passing through the aperture, a relief piston integral with the relief piston shaft below the bulkhead, an axial aperture in the relief piston shaft from its upper end to a point just above the relief piston, lateral apertures through said relief piston shaft just above the relief piston communicating with the axial aperture, and an elastic fluid pressure media in the chamber defined by cylinder and piston.

3. A variable compression shock strut including a cylinder assembly, a hollow piston assembly reciprocable within the cylinder assembly, a bulkhead having a skirt depending away from the cylinder affixed to the interior of the piston assembly intermediate its ends, an aperture in the bulkhead, a relief piston shaft slidable through the bulkhead aperture, a relief piston integral with the relief piston shaft affixed to the shaft below the bulkhead, the relief piston shaft extending above the bulkhead, an enlarged guide on the upper end of the relief piston shaft, an orifice tube depending from the opposite end of the cylinder from the bulkhead, an orifice plate affixed to the lower end of the orifice tube, an orifice in the orifice plate of larger diameter than the relief piston shaft but a smaller diameter than the relief piston guide and a fluid pressure media in the chamber defined by the cylinder assembly in the piston assembly.

References Cited in the file of this patent

UNITED STATES PATENTS

| | | | |
|---|---|---|---|
| 1,214,719 | Slattery | Feb. 6, | 1917 |
| 1,891,977 | Gould | Dec. 27, | 1932 |
| 2,451,171 | Mallen | Oct. 12, | 1948 |
| 2,563,518 | Dickerman | Aug. 7, | 1951 |
| 2,892,625 | Hartel | June 30, | 1959 |
| 2,916,283 | Westcott | Dec. 8, | 1959 |
| 3,056,598 | Conway et al. | Oct. 2, | 1962 |